United States Patent

Gehrke et al.

[11] Patent Number: 6,039,914
[45] Date of Patent: Mar. 21, 2000

[54] METHOD OF CONVERTING ASPHALT COMPOSITION ROOFING SHINGLES INTO DIMENSIONAL CONSTRUCTION PRODUCTS

[75] Inventors: Larry M Gehrke, Springfield; Russel J. Gehrke, Ozark; Michael S. Gehrke; Gabriel P. Gehrke, both of Seymour, all of Mo.

[73] Assignee: Future Tek, Inc., Springfield, Mo.

[21] Appl. No.: 09/060,040

[22] Filed: Apr. 14, 1998

Related U.S. Application Data

[60] Provisional application No. 60/043,022, Apr. 15, 1997.

[51] Int. Cl.7 ................................................ B02C 19/12
[52] U.S. Cl. .................... 264/460; 264/118; 264/126; 264/462; 264/911; 264/920
[58] Field of Search ........................ 264/115, 118, 264/125, 920, 460, 462, 126, 911

[56] References Cited

U.S. PATENT DOCUMENTS

| | | | |
|---|---|---|---|
| 2,619,675 | 12/1952 | Woolff | 106/282 |
| 3,924,023 | 12/1975 | Boranian et al. | 427/54 |
| 4,028,293 | 6/1977 | van den Berg | 260/28.5 AS |
| 4,189,238 | 2/1980 | Mendenhall | 366/7 |
| 4,274,243 | 6/1981 | Corbin et al. | 52/748 |
| 4,684,288 | 8/1987 | Chapa | 404/35 |
| 4,706,893 | 11/1987 | Brock | 241/23 |
| 4,963,055 | 10/1990 | Sims, Jr. | 404/41 |
| 5,221,702 | 6/1993 | Richards | 524/59 |
| 5,367,007 | 11/1994 | Richards | 524/59 |
| 5,609,295 | 3/1997 | Richards | 238/84 |
| 5,653,552 | 8/1997 | Wiley et al. | 404/77 |
| 5,848,755 | 12/1998 | Zickell et al. | 241/65 |

Primary Examiner—Jan H. Silbaugh
Assistant Examiner—Stefan Staicovici
Attorney, Agent, or Firm—Jonathan A. Bay

[57] ABSTRACT

Disclosed is a process of converting asphalt composition roofing shingles into dimensional construction products. Asphalt composition roofing shingles are de-consolidated, such as by grinding, into a crumble. The asphalt shingle crumble is processed in a manner to increase the fusibility activity of the asphalt without decomposing a substantial fractional amount of the asphalt to an ash-like brittleness. The foregoing can be achieved by heat exchange using infrared heaters as the heat source. One disclosed example trial of the process warmed the crumble to a bulk temperature of between about 130° F. and 150° F. Following that, the asphalt shingle crumble is compacted into the shape of a given dimensional construction product such as blocks, curbs, tiles, beams, posts, and so on. The best quality products are achieved by a two-step compaction process in which there occurs a certain time elapse between the two compaction steps. Hence the disclosed the process involves coordinating (i) the proper temperature range to raise the crumble to, against (ii) the proper compaction pressure(s) and time sequence in execution of the compaction step(s).

14 Claims, 6 Drawing Sheets

METHOD OF CONVERTING ASPHALT COMPOSITION ROOFING SHINGLES INTO DIMENSIONAL CONSTRUCTION PRODUCTS

CROSS-REFERENCE TO PROVISIONAL APPLICATION(S)

This application claims the benefit of U.S. Provisional Application No. 60/043,022, filed Apr. 15, 1997.

BACKGROUND OF THE INVENTION

The invention relates to products and process(es) of production thereof in which waste asphalt shingles are converted into useful dimensional construction material including without limitation paving blocks as for walkways or patios or landscape borders for flower or shrub gardens, retaining wall blocks, bricks, tire stops, curbs, tiles, posts, beams and so on.

Asphalt roofing shingles, needless to say, are popular and in widespread use across this country on structures of all types in every region. What has to date not been a sensational or headline-worthy fact about asphalt roofing shingles is, that they are responsible for a massively voluminous waste stream.

The waste stream of asphalt roofing shingles is, generally speaking, fed by two sources. The majority of the waste shingle stream comprises spent shingles that are, e.g., tear-offs from re-roof jobs or demolition debris. Much of the remainder of the waste shingle stream comprises scrap of new shingles:—either the tabs that are cut out during shaping of completed shingles or discarded rejects that failed to pass quality standards.

The portion of the waste stream composed of new shingles contains fresh asphalt. The portion the waste stream composed of spent shingles as from, e.g., tear-offs, is likely to include a variety of contaminant debris such nails, swatches of roofing felt (e.g., an underlying and redundant vapor barrier), wood from the underlying substrate (e.g., plywood), perhaps some metallic strip material from flashing, and so on.

The disposal of spent asphalt shingles is regulated. Spent asphalt shingles must either be sent to a sanitary landfill or a more special purpose demolition landfill. For roofing contractors, there is a sub-economy involved in the disposal of spent shingles which must be dealt with and figured into the calculus of a roofing job because, if ignored, all of the time, money, and equipment tied-up in disposing the spent shingles can wipe out profit.

For example, consider this situation which presently exists in Springfield, Mo. After a roofing contractor has torn off a roof, he or she is now faced with disposal. The city landfill 10 miles north of the center of town accepts such debris, at a charge of $27.50 each ton. The contractor, depending on where the job site is, may actually have a longer trip to go than the 10 miles from the center of town. Also, the roofing contractor may be charged a surcharge for offloading if he or she cannot offload in accordance with the landfill's local policies. More significantly, there is usually a wait in a line before the landfill can service the contractor's load, and at times the wait can be significantly extended if the line is long. This waiting period is most frustrating because it idles manpower and truck(s) for the duration. This especially acute when, after a hailstorm or like roof-damaging weather event, a roofing contractor experiences a temporary bonanza in business. Provided, of course, that he or she does not squander much of this temporary bonanza away with an unnecessarily long commute to and from, or delay because of waiting at the landfill.

At least one containerized trash-hauler has reacted to the plight of the roofing contractors with a specialized service by which, the containerized trash-hauler has at least one centrally located transfer station where it will also accept the spent shingle debris:—at a premium charge naturally enough. The basic charge is $37.50 each ton, which excludes surcharges if help is needed offloading the debris and depositing it into the container(s).

Regardless of by which option the roofing contractor disposes of the spent shingles, the outcome for the spent shingles is the same:—the spent shingles are landfilled. It has been recognized by the inventors hereof that this stream of waste shingles presently being landfilled in this country, can be diverted to processing centers in accordance with the invention for conversion/recycling into useful products. Moreover, a processing center in accordance with the invention can be coordinated with one or more collection centers in accordance with the invention in order to (i) service the needs of roofing contractors (or whoever else finds themselves with waste shingles) by providing a conveniently located dump site, as well as (ii) service the processing center by obtaining a continuous supply of the feedstock (i.e., waste shingles) for the processing center.

A number of additional advantages and aspects of the invention will be apparent in connection with the following summary of the invention and discussion of preferred embodiments and examples.

SUMMARY OF THE INVENTION

It is an object of the invention to recycle waste asphalt-composition roofing shingles into useful dimensional construction products.

It is an alternate object of the invention to achieve the recycling of the waste asphalt shingles by a process which enhances the fusibility and/or flux activity of the asphalt while taking care not to overdo it at the risk of decomposing a substantial fractional amount of the asphalt to an ash-like brittleness.

It is an alternate object of the invention to achieve the foregoing recycling process transpire without need of fillers or solvents.

These and other aspects and objects are provided according to the invention in a process for converting asphalt composition roofing shingles into dimensional construction products. In the inventive process, asphalt composition roofing shingles are de-consolidated into a crumble. The asphalt shingle crumble is processed in a manner to increase the fusibility activity of the asphalt without decomposing a substantial fractional amount of the asphalt to an ash-like brittleness. The foregoing can be achieved by heat exchange process using infrared heaters as the heat source. In one non-limiting example disclosed herein, the heaters warm the bulk temperature of the crumble to between about 130° F. and 150° F. In the same example, the power consumption to achieve this corresponded to about 65 W-hr for each pound of the asphalt shingle crumble. In other words, that is, the power consumption for each pound of crumble was as little as what is consumed by a 65-watt light bulb in one hour. To return to the process, the asphalt shingle crumble is next compacted into the shape of given dimensional construction product, which can include without limitation such products as retaining wall blocks, paver blocks, tire stops, bricks, curbs, tiles, posts, beams, and so on. In the specific case of paver blocks, the best quality paver blocks have been achieved by a two-step compaction process which includes a certain time elapse intervening between the two compaction steps. Hence the inventive process involves coordinating (i) the proper temperature range to raise the crumble to, against (ii) the proper compaction pressure(s) and time sequence in execution of the compaction step(s).

Preferably an infeed of asphalt composition roofing shingles is obtained by diverting waste shingles headed for landfills, into process centers in accordance with the invention. Experience shows that the waste shingles includes foreign debris associated with roof tear-offs such as nails, roof felt, wood from the roof deck, flashing and so on. Some of the foreign debris is separated, especially a substantial portion of the nails. The remainder of the foreign debris not separated out, is tolerated and ends up harmlessly "frozen" in the matrix of the completed products.

The step of de-consolidating the asphalt composition roofing shingles can optionally be achieved by grinding. By however achieved, the shingles are preferably de-consolidated into a crumble which ranges between extremes of fine matter and coarse matter, the extreme size of coarse matter preferably being chunks of about ½ inch.

The compaction steps can alternately comprise extrusion or press-forming, or both on the same product. In the specific case of the paver blocks mentioned above, the press-forming is executed after a given elapse of time after a previous step of extrusion.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 5b is a side view taken in the direction of arrows Vb—Vb in FIG. 5a;

FIG. 7 is an elevational view of a punch press machine for execution of the step compaction as indicated in FIG. 1; and, FIGS. 8 through 10 are a series of comparable perspective views showing illustrative example products in accordance with the invention wherein:

DETAILED DESCRIPTION OF THE PREFERRED EMBODIMENTS

Figure 1:
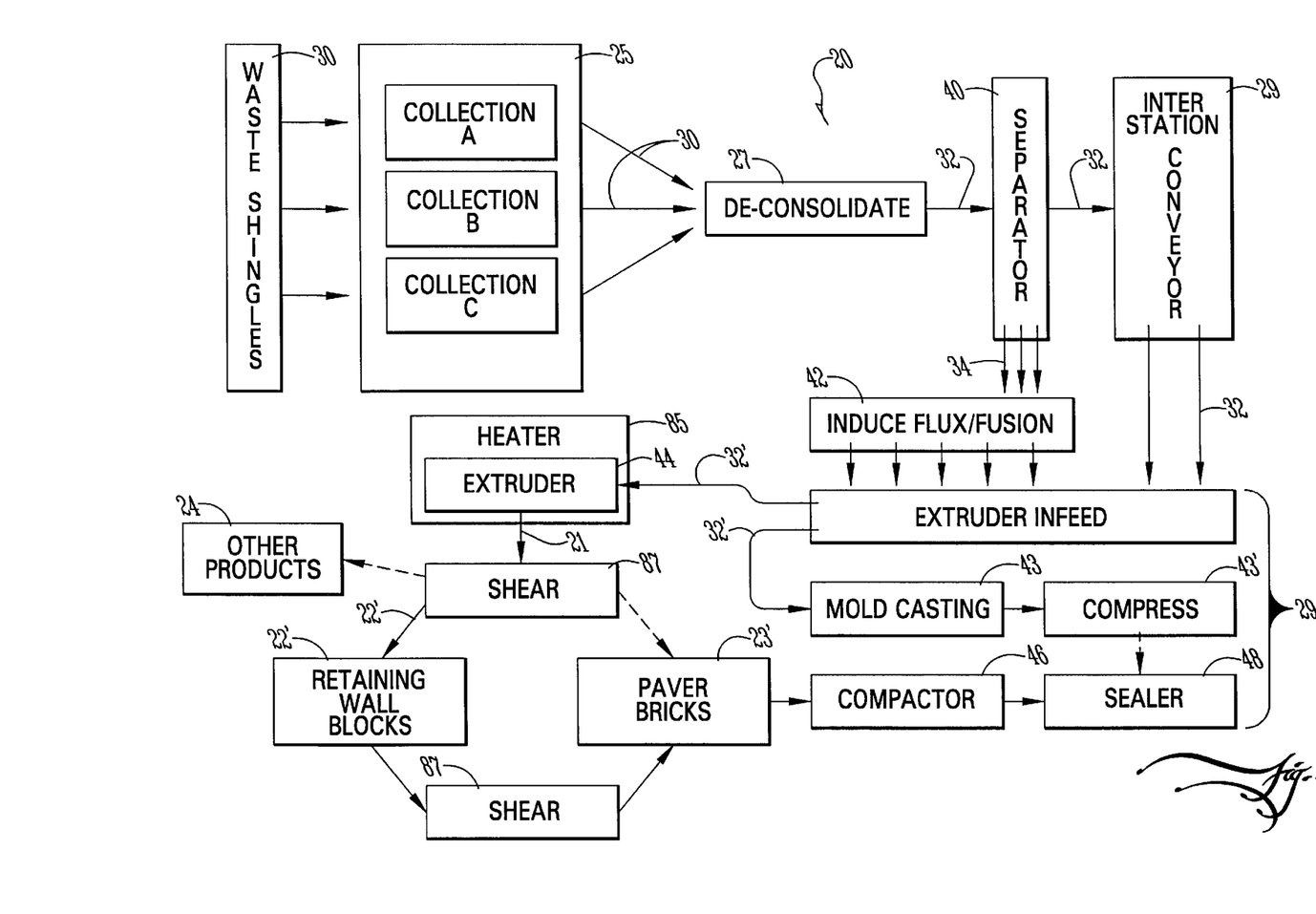
FIG. 1 is a flow chart that diagrammatically depicts a process of production in accordance with the invention, which uses waste asphalt shingles as feedstock in the production of various products in accordance with the invention.

The flow chart in FIG. 1 diagrammatically depicts a process 20 of production in accordance with the invention, in which waste asphalt shingles 30 are converted into various dimensional construction products 22–24 in accordance with the invention. These products 22–24 include without limitation retaining wall blocks 22 or paver blocks 23 as well as other products 24 including some mentioned elsewhere in this disclosure.

In FIG. 1, waste asphalt shingles 30 are collected at various collection centers 25, e.g., centers A, B and C. The collection centers 25 are established for obtaining a supply of the waste shingles 30 in order to supply and feed the process 20 in accordance with the invention. As previously mentioned, the stream of waste asphalt shingles is, generally speaking, fed by two sources. Predominantly the waste shingle stream comprises spent shingles that are, e.g., tear-offs from re-roof jobs or demolition debris. Much of the remainder of the waste shingle stream comprises scrap of new shingles, such as the tabs that are cut out during shaping of completed shingles, or else the discarded reject shingles that fail to pass quality standards. The new-shingle portion of the waste stream contains fresh asphalt. The spent-shingle portion of the waste stream (e.g., as from tear-offs) has been exposed to weather, most often for a substantially extended time, such that its asphalt is not "fresh." Also, the spent-shingle portion of the waste stream is likely to include a variety of contaminant debris such as nails, swatches of roofing felt, wood from the underlying roof deck (e.g., plywood), perhaps some metallic strip as flashing, and so on.

An overview of the process 20 in accordance with the invention includes the following aspects. The waste shingles 30 are collected at the collection center(s) 25. From there the waste shingles 30 are de-consolidated as indicated at 27 (one example of which will be more particularly described below in connection with FIG. 2). The output of the de-consolidation 27 is a mixture of asphalt-shingle crumble 32 and foreign debris 34, as will also be more particularly described below. A step of separation 40 partially diverts out a fractional amount of the foreign debris 34, the remainder of the foreign debris which is not separated out is tolerated, and remains included with the asphalt-shingle crumble 30 and so will be found harmlessly "frozen" within the asphaltic matrix of the completed end-products 22–24 in accordance with the invention.

For convenience in this description, the de-consolidated material 32 that is substantially composed of the asphalt-shingle crumble—but also includes fractional amounts of foreign debris as mentioned above—is collectively referred to as the "asphalt shingle crumble," or "crumble." It is simply understood that the term "crumble" does not refer to a "pure" composition of de-consolidated shingle alone, as the "crumble" 32 also includes fractional amounts of foreign debris.

With renewed reference to FIG. 1, the crumble 32 is conveniently transportable between remote centers 27/25 and 29. That way, the step(s) of collection 25 and de-consolidation 27 can take place at one or more remote locations 25 or 27 whereas the process steps described next can occur at an altogether separate location 29 many highway miles away. Whether at the same site or not, the following process steps for the crumble 32 include of inducing increased flow activity within the asphalt component of crumble, and/or invigorating the fusibility properties of the asphalt (as indicated by reference numeral 42). In one example embodiment, this step 42 is achieved by heating the crumble 32 with a bank of heater units. Heating the crumble 32 apparently both activates the flux components of the asphalt as well as enhances its "tackiness" or fusibility so as to allow re-consolidation of the crumble 32 in products 22–24 if compacted. The output of this step 42 is, relatively speaking, a viscous mass 32' rather than unconsolidated crumble 32, which will permit re-consolidation into products 22–24 in accordance with the invention.

Re-consolidation can be achieved multiple ways. Originally the inventors cast the mass 32' into a mold 43 or paver-block shaped cavity, and further compressed 43' the casting as it cooled in the cavity. Speed has been achieved by extruding the viscous mass 32' through an extruder 44 which concurrently compacts as well as gives a two-dimensional shape to the resultant extrusion 21.

To turn more particularly to the extruder 44, it forms the extrusion(s) 21 which is(are) sheared off at adjustable, pre-set lengths to form ingots 22'. The ingots 22' are useful as products such as retaining wall blocks 22 or landscape logs and the like. However, the ingots 22' can be processed further to make further products such as bricks or paver blocks 23 as well as other products still.

Typically, the further steps to take to make paver blocks 23 from the ingots 22' comprises (i) shearing to a stock size 23', (ii) compaction of the stock 23' to a final size 23, and, optionally, (iii) application 48 of a sealant on/in the paver blocks 23 so that the asphaltic tars won't track on shoe soles and the like. Example methods of sealing off the asphaltic tars from contact with shoe soles includes immersing the paver blocks 48 in coal tar or paint, or alternatively applying a coating to the top surface including a mineral coating or the like.

Much of the foregoing will be described more particularly below with reference to FIGS. 4 through 7. What follows is background information on "what is" asphalt prepared roofing.

Asphalt prepared roofing (e.g., shingles) is manufactured by impregnating a dry roofing felt with a hot asphaltic saturant. A coating, consisting of a harder asphalt compound having a fine mineral filler, is applied to the weather-side of the saturated felt. Into this coating is embedded a mineral surfacing such as mineral granules, powdered talc, mica, or soapstone. The reverse- or roof-side of the roofing has a very thin coating of the same hard asphalt-composition, and then the roof-side is usually sprinkled with powdered talc or mica to prevent the roofing from sticking in the package. Asphalt shingles usually have a granular surfacing either in natural colors prepared from slate or artificial colors usually made by applying a coating to a rock granule base. Asphalt shingles are made in strips and as individual shingles. The different shapes and sizes of these shingles provide single, double, and triple coverage of the roof deck.

Asphalts are bitumens and the one most commonly seen in roofing is obtained from petroleum residuals. What are not used as much are lake asphalts such as Trinidad and Bermudez, which are relatively softer and primarily used in paving. Also, natural asphalts such as gilsonite and elaterite are likewise generally shunned—not for being too soft, but—because they are relatively too hard and brittle for use in roofing (or paving), though they find extensive usage in asphalt coatings, paints, and varnishes.

The most satisfactory roofing asphalts are obtained by air-blowing therethrough a steam- or vacuum-refined petroleum residual. Saturating asphalts must posses a low viscosity in order for the felt to become thoroughly saturated. Coating asphalts must have good weather-resistant qualities and posses a high fusion temperature in order that there will be no flowing of the asphalt after application to the roof. The coating asphalt is blown for a much longer time than the is the saturating asphalt. It is known in the industry that the addition of 30 to 40 percent of finely ground mineral filler to the coating asphalt greatly improves its weathering qualities. The fine mineral filler used usually is obtained from, among other suitable source materials, limestone, dolomite or silica.

The felt used in shingle mats is usually a continuous sheet sometimes composed of felted fibers of selected rag, specially prepared wood, and high-quality waste papers. Other times the felt is composed of fiberglass mats. The constituents of the felt can be varied to adjust the desired qualities of strength, absorbency, and flexibility.

The fine mineral surfacing on the roof-side of shingles (e.g., applied to prevent sticking) is usually obtained from mica, talc, or soapstone, among other suitable source materials. The coarse-grade of mineral surfacing used on the weather-side of the shingle is either a crushed slate or else a coarse mineral granule often colored artificially by coatings of pigmented silicate, cement, or a ceramic glaze which after firing make the coatings permanent.

Hence, in asphalt shingles, the felt mat generally comprises between about 2 and 15 percent of the weight of the shingle. The asphalt component generally varies between about 19 and 36 percent by weight. More particularly, fiberglass-felt shingles contain about 19 to 22 percent asphalt, whereas "organic-felt" shingles generally contain about 30 to 36 percent asphalt. The relatively-fine mineral filler/stabilizer (e.g., limestone, dolomite or silica and so on) typically comprises about 8 to 40 percent of the weight of the shingle. About 90 percent of this relatively-fine mineral matter is finer than 0.15 mm, and about 70 percent is finer than 0.08 mm. The coarser mineral matter used predominantly for coating the weather-side of the shingle comprises between about 20 and 38 percent of the weight of the shingle.

Figure 2:
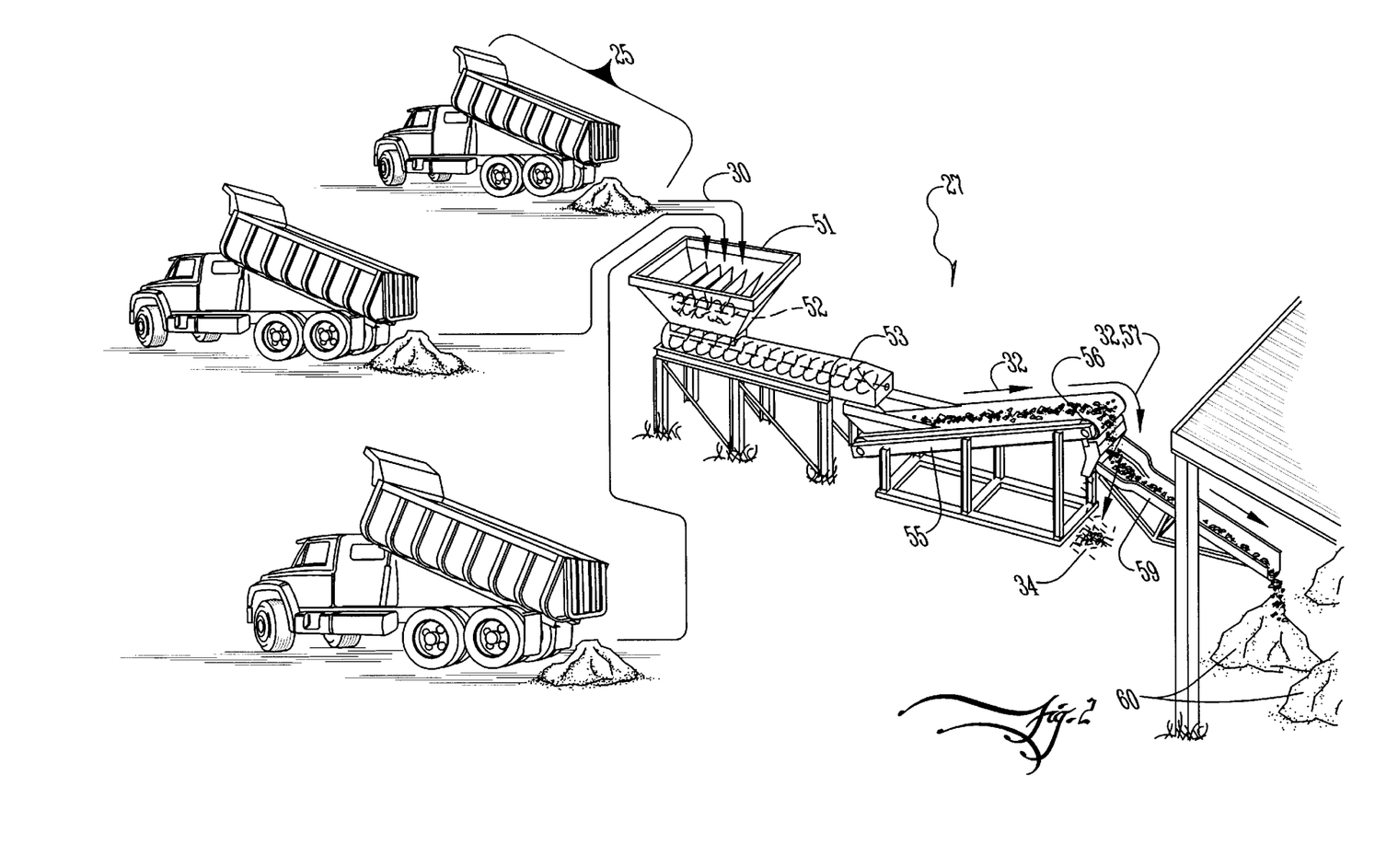
FIG. 2 is a perspective view of collection of waste shingles and the de-consolidation thereof into crumble.

To turn now to FIG. 2, it shows more particularly the steps of collection 25 and de-consolidation 27 of waste shingles 30. De-consolidation in this example is achieved by a hammer mill 51. The waste shingles 30 can be collected at various collection centers 25. The physical site 27 of the hammer mill 51 need not be located at each or any of the collection center(s) 25. In fact, a single site 27 having one or more hammer mills 51 can service the intake of multiple collection centers 25. Also, waste shingles 30 might be procured as the scrap, as previously stated, from shingle manufacturers, as the discard of the tabs thereof or sub-quality rejects and so on. A supply of scrap from a manufacturer is likely to be transported directly to the hammer-mill site, and bypass altogether a collection center 25. The collection centers 25 are established more for the convenience of roofing contractors where sufficient re-roofing and/or demolition activity takes place in order to justify the establishment and maintenance of a collection center therefor.

However obtained, the waste shingles 30 are fed to the hammer mill 51. A commercial source for a hammer mill 51 of this type can be procured from the Haybuster Manufacturing corporation of Jamestown, N.Dak., including its tubgrinder models, nos. H1000, H1100, and/or H1100E. In the drawing, the hammer mill 51 has a bottom wall in which is situated a grinding cylinder 52. The grinding cylinder is conventional and has a central shaft carrying spaced apart discs between which are mounted, on the periphery of the discs, freely-pivotable hammers (not all of which are discernible in the view). When the grinding cylinder 52 is turned at high speed (e.g., 1750 rpm or so), the hammers flail about, and indiscriminately shatter or disintegrate the shingles into a crumble 32 (this is not shown). About ⅓rd of the asphalt-shingle crumble 32 is powder, the other ⅔rds or so being small chunks generally finer than ½-inch. The crumble 32 is allowed to sift through a semi-cylindrical screen (not in view) which surrounds the lower one-half of the grinding cylinder 52. After passing through the screen, the crumble 32 drops into a U-shaped trough of a screw conveyor 53, which conveys the crumble 32 for discharge onto the low end of an upsloping belt conveyor 55.

The belt conveyor 55 carries the crumble 32 up its upslope to discharge it over a head roller 56. The head roller 56 is magnetic and/or magnetized by electric current. The bulk of the crumble 32 is composed of non-ferritic material and is thrown off the belt conveyor 55 at the head roller 56 in a main cascade 57 as shown. The main cascade 57 of the crumble 32 lands in a U-shaped trough 59 of another conveyor. Much of the ferritic matter 34 within the crumble 32, which mostly is nails, are by force of magnetism diverted out of the main cascade 57 to fall away in a pile 34 that builds more directly underneath the head roller 56. The foregoing achieves the step of "separation" 40 mentioned in connection with FIG. 1, in which some amount of the foreign debris is diverted out of the crumble 32. The bulk of the foreign debris 34 diverted in this way comprises ferritic nails and some flashing. Other sources of foreign debris such as aluminum flashing, paper, cellulose, felt matter and so on, remains entrained within the main cascade 57 of the crumble 32. The foreign debris entrained in the crumble 32 from this point on, will in the end appear within the asphaltic matrix of the end products 22–24 without detracting from the desirable properties thereof.

The main cascade 57 of the crumble 32 which lands in the U-shaped trough 59 is stockpiled as shown. Preferably the stockpiles 60 are under cover from rain and weather in order to limit moisture in the crumble 32.

Figure 3:
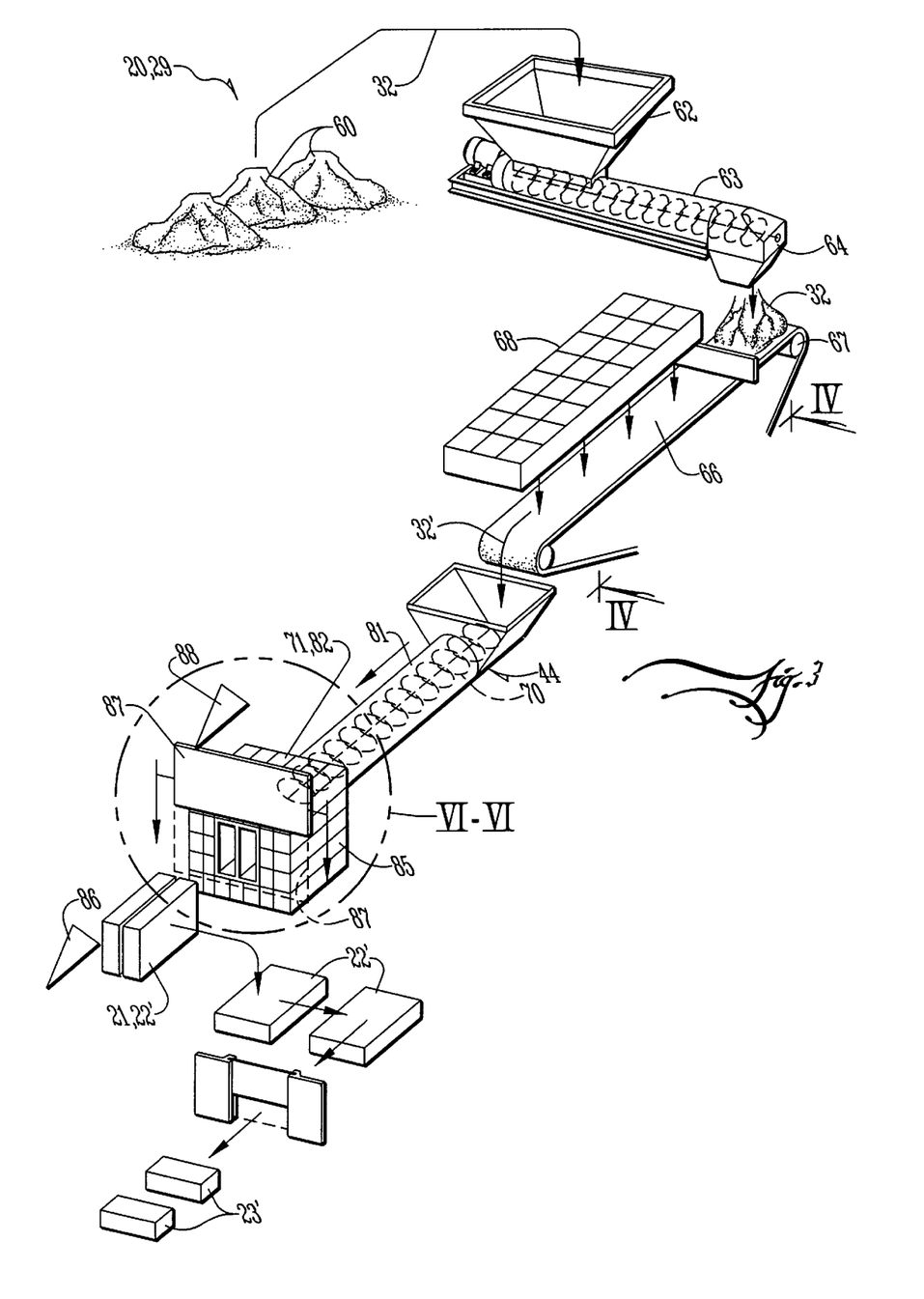
FIG. 3 is a perspective view of processing of the de-consolidated shingle crumble into products in accordance with the invention.
Figures 8, 9:
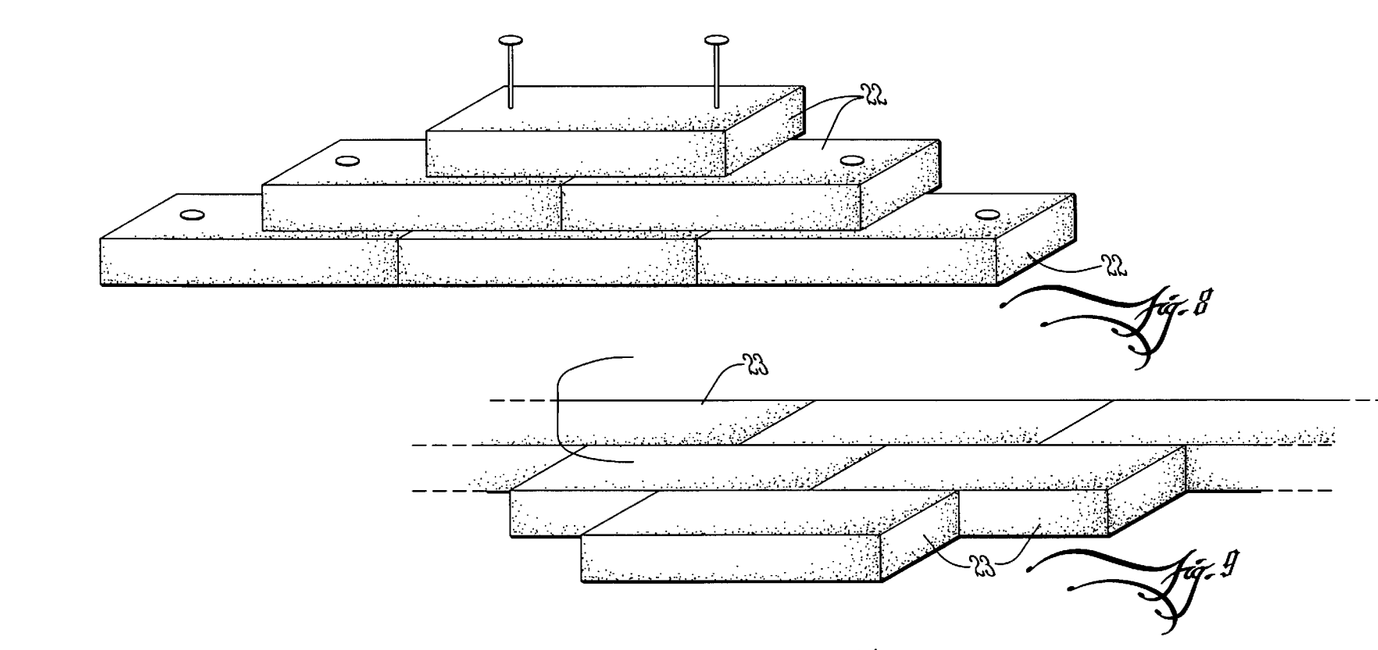
FIG. 8 shows elongated blocks in accordance with the invention arranged to form a portion of a retaining wall.
FIG. 9 shows paver blocks in accordance with the invention arranged to form a portion of a walkway or patio.
Figure 10:
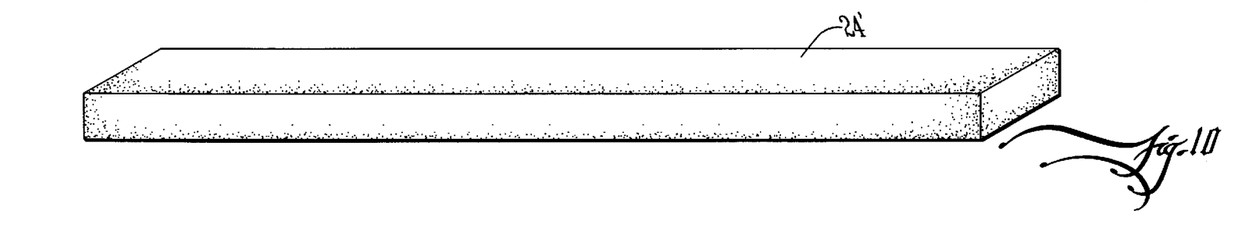
FIG. 10 shows a tire stop in accordance with the invention disposed as for forming a parking aisle partition in a parking lot.

FIG. 3 shows aspects of a processing center 29 in accordance with the invention, for production of products 22–24 as indicated by FIG. 1 or shown by FIGS. 8 through 10. The location of the processing center 29 may be independent of the de-consolidation and/or collection center(s) 25 or 27 (see FIG. 2). Whereas the feedstock for the processing center 29 is indeed the crumble product 32 shown in stockpiles 60 in FIG. 2, the crumble 32 may simply be transferred/transported to a remote processing center 29 by any conventional means including over-the-road hauling and the like. Hence one or more remote de-consolidation center(s) 27 can supply a single processing center 29. Alternatively, the de-consolidation and processing steps 27 and 29 can be executed on one same site, and hence service one or more collection center(s) 25 or other source(s) of waste shingle.

The general aspects shown by FIG. 3 are as follows. The crumble 32 is fed into a main hopper 62 which, by means of an inter-transfer screw conveyor 63, feeds a metering hopper 64. The metering hopper 64 deposits the crumble 32 onto the table 66 of a drag-chain conveyor 67. The drag-chain conveyor 67 transports the crumble 32 slowly under overhead infrared (IR) heaters 68. After passing under the overhead heaters 68, the crumble 32 changes to becoming relatively viscous, and this viscous matter 32' is deposited into the intake trough of an extruder apparatus 44. The extruder apparatus 44 comprises a driven auger 70 which pressurizes the viscous crumble 32', causing extrusion through a pair of twin rectangular-tunnels of a die section 71. The resultant extrusion 21 outputted at the exit of the extruder tunnels 71 is sliced off at selectable lengths to produce ingots 22'. The ingots 22' can be set aside as completed products 22 or else further processed for making into other products such as paver-blocks 23 as shown. Much of what FIG. 3 shows on a general level will be more particulary described below in connection with FIGS. 4 through 7.

To return to the "heaters" or IR radiators 68, these units 68 cause multiple effects in the crumble 32, perhaps not all of which are understood. For instance, observation suggests that the heat (e.g., thermal radiation) changes a portion of the asphaltic component in the crumble, such that it will "flow", and such that (at least within limits) further raising the temperature of the flux asphalt also reduces its viscosity. Additionally, the heat (e.g., thermal radiation) elevates some portion of the asphaltic component above its fusion temperature so that, after cooling, the fusible component(s) coheres together and encapsulates the rest of the crumble components in a cement-like matrix. It is not known if the flux components and the fusible components are obtained by the same constituent component of the asphalt, or different ones.

What is known, however, is that a quirky thing has been discovered with the crumble. It has been found that if—without heating it—the dry crumble is poured into a mold and then, all while at ambient temperature, compacted under substantial pressure (e.g., under tons of pressure), the crumble will reconsolidate to a limited extent. That is, the fusible component in the asphalt will cohere in a weak matrix under sufficient compaction, even at ambient temperature. Hence a construction block can be produced this way, but, it has several undesirable qualities. For one thing, all the fusing appears to occur only at the surface boundaries, as the fusion does not extend very deep into the core of the block. Thus the core of the block remains mostly an unfused, unconsolidated crumble. Hence products produced this way have at best a brittle skin which if broken, the core will crumble apart like an aspirin pill. Blocks produced this way are undesirably non-durable, almost "fragile."

The "fusibility" activity or property of the asphalt—and what that means to the asphalt's capability to "reconsolidate"—can be compared to the "vapor pressure" activity or property of water and what that means to water's capability to "evaporate." Water at room temperature (e.g., ~70° F.) has a vapor pressure, and over extended time it will completely evaporate. But raising the water temperature to between about 130° F. or 150° F. or so, greatly shortens the time it takes to complete evaporation. To return to the situation with asphalt, it exhibits limited "fusibility" activity or properties at ambient temperatures, but it is an object of the invention to elevate or invigorate (e.g., by heat exchange or otherwise) the "fusibility" activity thereof for the purposes of improved re-consolidation.

So on one extreme a block—albeit an inferior one—can be produced by pressure alone, without heat. At the other extreme, there can be too much heat. More particularly, heating the crumble beyond a given limit appears to decompose a substantial fractional amount of the asphalt to ash. That is, the crumble turns very dark, and no matter how firmly it is compacted, it is resistant to re-consolidation, it remains virtually in its original crumbly residue form, and if it does cohere to any limited extent it is brittle. Whereas the foregoing has been discovered by the inventors hereof, the phenomena is not precisely understood. It is not known whether too much heat decomposes the long-chain high-molecular weight hydrocarbons, or changes their form, or else "bakes out" or vaporizes solvent components, such that the fusible properties of the asphalt as a whole are deteriorated. What is known is that, too much heat virtually destroys the usefulness of the crumble for the purposes of the invention.

Hence an inventive aspect of the process 20 in accordance of the invention is the coordination of (i) the proper amount of "heat" added to the crumble 32 against (ii) the proper pressure(s) and time elapse after heating which are deployed in compacting the heated crumble 32' into useful products 22–24. A non-limiting example of the process 20 in accordance with the invention is given next. The following example includes recitation of actual measured values gotten from trials with an experimental, proof-of-concept pilot plant.

Figure 4:
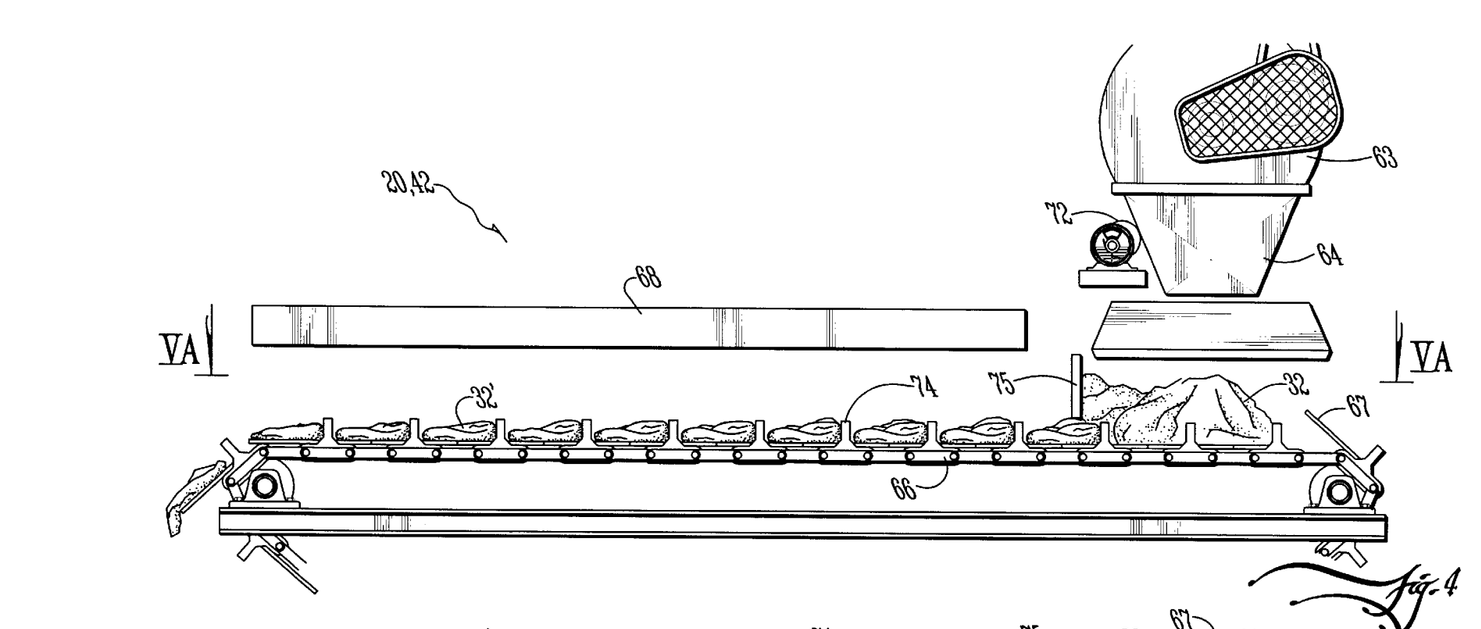
FIG. 4 is an elevational view taken in the direction of arrows IV—IV in FIG. 3.
Figure 5A:
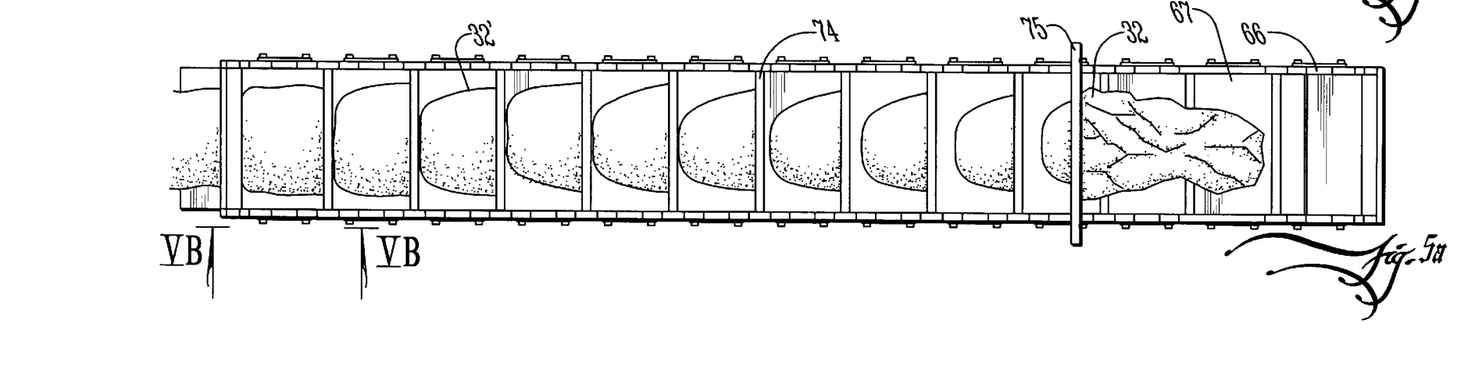
FIG. 5a is a plan view taken in the direction of arrows Va—Va in FIG. 4.

With reference to FIGS. 4 and 5a, to date trial and error experience with the step of heating 42 the crumble 32 has found that one way of obtaining sufficient products 22–24 in accordance with the invention can be achieved by the following. The metering hopper 64 is shown depositing crumble 32 onto the table 66 of the drag-chain conveyor 67. The outlet of the metering hopper 64 measures 3 inches square. It has an eccentric cam 72 banging one side to facilitate the pouring out of the crumble 32 by force of gravity without "caking" into the hopper 64. The shape and configuration of the metering hopper 64 delivers a fairly constant flowrate of the crumble 32 corresponding to about 1800 lbs/hr, or about ½-lb/sec.

As previously alluded to, the actual measured values given in this example are for convenience in this description for exemplifying one actual trial set-up of the invention. However, some values can be scaled up or down as desired. Alternatively, other values such as temperature can be varied within certain extreme parameters, the extreme limits of which have not been determined to date. Accordingly, the values given for this example are included merely for convenience in this description do not limit the invention to the measures actually given, and that includes neither to the actual values given in any instance nor to the relative proportions among the given values.

That aside, the poured-out crumble 32 lands on the table 66 of the drag-chain conveyor 67. The drag-chain conveyor 67 measures about 24 inches wide, and it has ½-high "links" or partitions 74 spaced 4½ inches apart to push or motivate the crumble 32. The pushed crumble 32 first encounters a leveler plate 75 which causes the crumble 32 to spread laterally across the table 66 of the conveyor 67 to width of about 20 inches or so and a depth on the order of a ½ inch or so. Again, the throughput rate of the crumble 32 is about 1800 lbs/hr in this instance.

The drag-chain conveyor 67 moves at a speed of about 14 ft/min. It conveys the crumble underneath the bank of IR heaters 68, which comprise four IR units arranged abutted closely together in a two-by-two array. In aggregate the four units 68 combine to give an 8 foot long, 20 inch wide IR heater section, centered axially above the flight line of the conveyor 67, suspended about 6 inches above the plane of the conveyor table 66. The IR heaters 68 comprise a gas-fired porous-ceramic refractory mantle. Each IR unit outputs about 100,000 Btu/hr (29,300 watts) of thermal-radiant power for shining onto the crumble. The four IR units 68 summed together produce a total power output of about 400,000 Btu/hr (117,000 watts). To achieve this power output, the IR heaters 68 consume about 4.4 lbs/hr of propane fuel, which has a high heating value of about 90,000 Btu/hr (26,400 watts).

The crumble 32 is dark-colored in fact, and is certainly likely to behave as a black body for thermal-radiation absorption purposes. Hence, ignoring losses, the resultant energy transferred to the crumble passing at the rate of 1800 lbs/hr under 400,000 Btu/hr (117,000 Watts) of heat, corresponds to a power absorption factor of about 222 Btu/lb (65 W-hr/lb) for the crumble 32. For scale, each pound of crumble 32 is absorbing about the same amount of energy consumed in one hour's time by a 65 watt-light bulb.

In terms of temperature, measured values show that the heater section 68 raises the bulk or mean temperature of the crumble 32 to within a range of between about 130° F. and 150° F. Local variation of the crumble 32's surface temperature has been measured to vary to as high as about 400° F.

Observations have given one obvious finding, and that is that heating the crumble 32 this way causes some flow in the asphalt. Flow has plainly been observed. Also, observations suggest that heating the crumble 32 appears to renew the tackiness of the asphalt. FIG. 5a shows the partitions 74 pushing discrete masses 32' of the crumble. As the partitions 74 progress beneath the heaters 68, the phenomena which will be illustrated by FIG. 5b have been observed.

With reference to FIG. 5b, the direction of advance of the conveyor 67 is indicated by arrow 77. Thus the partition 74 is "pushing" the mass 32' before it in the same direction 77. Observations record that a skin on the mass 32' will pool and flow down the forward slope of the mass 32' onto the table 66 of the conveyor 67, as indicated by a succession of arrows 78 (i.e., the succession of arrows 78 indicating a succession of waves of skin layers). Also, the downflow 78 will adhere to the table 66 of the conveyor 67 such that the bulk of the mass 32' has to roll over the downflow 78, as indicated by arrows 79. Hence the partition 74 generally rolls the mass 32'. That is, the outer surfaces of the mass 32' generally roll something like a tank tread. However, since successive waves 78 of skin portions are always flowing down the forward slope of the mass 32', there is also some stirring involved. So there is some support for the belief that material in the core of the mass 32' eventually gets exposure at a surface. As FIG. 3 shows, the drag-chain conveyor 67 discharges each viscous mass 32' into the feed trough of the extruder 44.

Figures 5A, 6:
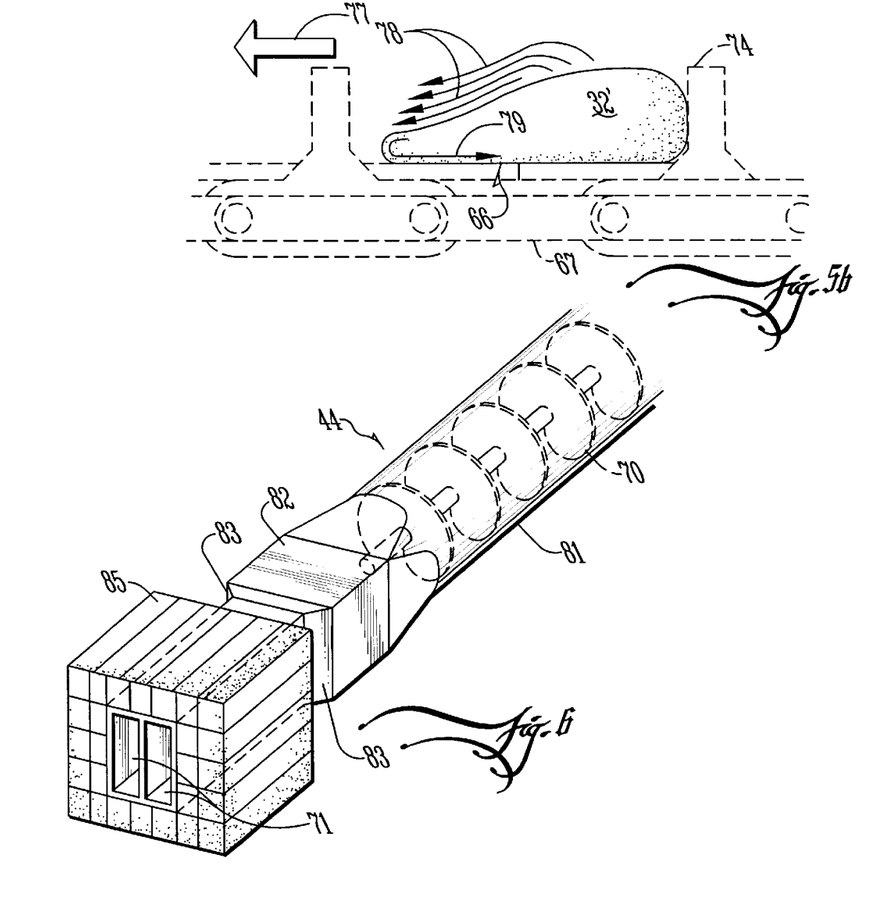
FIG. 6 is an enlarged scale view of detail VI in FIG. 3.

FIG. 6 more particularly shows the extruder apparatus 44. The extruder apparatus 44 comprises the auger 70 and the twin die-tunnels 71. The auger 70 forces the viscous crumble 32' to squeeze through these die tunnels 71. The auger 70 is about 3 feet in length, the tunnels 71 about 1 foot.

The auger 70 rotates inside a closely surrounding cylindrical case 81. By nature the viscous crumble 32' produces a good seal between the auger 70's helical edge and the cylindrical case 81 so that there is little or no leakage of the viscous crumble 32' backwards across the edge. Also, there is good frictional adhesion between the pushing surface of the auger 70 and the viscous crumble 32' such that the auger 70 can force the viscous crumble 32' into the die sections 71 at high pressure. No attempt to date has been made to measure the actual pressure(s) inside the entrant region 82 of the die sections 71. However, the following observations have been recorded. It is preferred not to blanket the auger case 81 with external heaters in that case 81's relative coolness seems to enhance the effectiveness of the auger 70.

Also recorded has been the observation that, the strain on or whine of the motor (not shown) that powers auger 70 may vary noticeably among various trial runs, in fact so much so that at times the 5 HP motor which drives the auger 70 has stalled. One explanation for this might be that there is variation in the mean temperature of the viscous crumble 32' among the trial runs:—e.g., it is relatively warmer and less viscous one time against it being relatively cooler and more viscous another time. Nevertheless, the belief is that the viscous crumble 32' is, on average, forced into the entrant section 82 of the dies at considerable pressure.

The entrant region 82 of the die section 71 represents a change in cross-section from a circular of the cylindrical auger case 81, to a square about 7¾ inches on a side. The 7¾ inch square 82 is partitioned into the pair of twin rectangular tunnels 71 initially measuring about 7¾×3⅝ inches each. These tunnels 71 are about 1 foot long, and at around their midway points, each tunnel 71 has one of the 7¾ inch high sidewalls "neck in" as indicated at 83, by about ½ inch, such that the narrower dimension of each tunnel 71 has constricted down to about 3⅓ inches wide. This "necking in" section 83 occurs as 45° chamfer. The compaction of the viscous crumble 32' at this necking-in section 83 is highly desirable for compacting and re-consolidating the viscous mass 32'.

The die section 71, unlike the auger case 81, is indeed blanketed by heater packs 85 (only forward portions are shown, as the rearward portions are broken away to reveal the "necking in" sections 83). The heater packs 85 are each a unit of a 3,850 watt (26,300 Btu/hr) heater, or which consume 7,700 watts (13,000 Btu/hr) of power in combination. The heater packs 85 keep the wall temperatures of the tunnels 71 relatively constant at between about 190° F. and 200° F. Again, the bulk temperature of the viscous crumble 32' inside the tunnels 71 remains within the 130° F. and 150° F. bracket. The temperature of the outside of the heater packs 85 reaches about 450° F. It has been discovered that, the lower the wall temperature of the die tunnels 71, the more friction there is with the wall, and the more pressure required to complete extrusion. Whereas the resultant extrusion would be a harder-packed mass if the wall were kept cooler, the pressure for forcing such an extrusion would also overpower the extruder motor. Hence the walls of the die tunnel 71 are heated to make the viscous crumble 32' greasier at the wall, and facilitate flow of the extrusion at lower pressures. At the exit, the extrusion 21 has a surface boundary extending about ⅛-inch deep which is raised to a temperature of about 200° F., whereas the core temperature remains in the 130° F. and 150° F. bracket.

The pair of extrusions 21 that exit the die tunnels each measures about 3⅓ inches wide by 7¾ inches high. An ingot-limit switch 86 (for this, refer back to FIG. 3) is arranged to activate the blade 87 of a shear. The ingot-limit switch 86 can be set to slice off an ingot 22' at various selectable lengths, say, for example, 20 inches. The ingot-limit switch 86 is located in the path of the extrusion 21 exiting a die tunnel 71 such that the nose of the extrusion 21 abuts the ingot-limit switch 86 after it extends sufficiently far out from the exit (this is not shown). Contacting the ingot-limit switch 86 disengages the transmission (not shown) of the auger 70 (to stop it) concurrently as it activates the shear blade 87 on an extension stroke. The shear 87 automatically completes a cycle of the extension stroke followed by a retraction stroke. The ingot 22' is sliced off for transfer elsewhere. At the completion of the retraction stroke, the shear blade 87 contacts a blade-limit switch 88 which re-engages the transmission for the auger 70 (to restart it).

The time elapse for one cycle of the shear blade 87 is about 0.8 seconds. This process of activating the shear 87, repetitively, produces an endless succession of ingots 22' at the rate of 1800 lbs/hr.

The ingots 22' can serve as end products 22 in themselves. For instance, the ingots 22' can be used as retaining wall blocks 22, and this is shown in the drawings by FIG. 8. While the ingot 22' is still warm, a pair of nail holes are punched into it, and it is thus complete for use as a retaining wall block 22. It can be set aside for cooling.

Alternatively, with reference back to FIG. 3, the ingots 22' can be processed further for the production of other products such as paver blocks 23 and like. It is desirable for paver blocks 23 that they be packed harder still. Hence, immediately after an ingot 22' has been formed, it is desirable at that time to slice the ingot 22' into paver-block stock 23', while the material is still soft. The ingot 22' is sliced up 3½ inch lengths, to give a stock piece 23' measuring about 3½×3⅓×7¾ inches.

Figure 7:
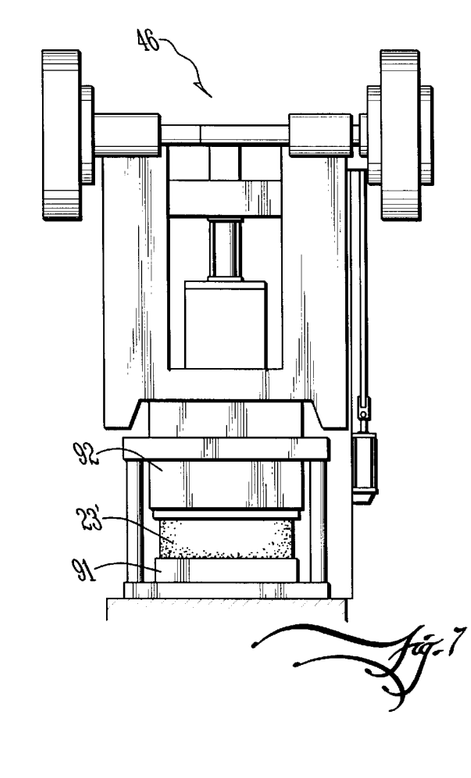

With reference to FIG. 7, a given stock piece 23' is set up on an elevated base 91, which itself sits on the table of a punch press machine 46. The stroking head of the punch press machine 46 carries a cooperating die 92 which is formed with a cavity (not in view) which will stroke down and completely lower around and surround the stock piece 23' as well as the elevated base 91 it rests on. The punch press 46 that is presently used delivers 60 tons of pressure. The elevated base 91 has a 1-inch diameter hole or "gate" (not in view) centered down through it to allow excess viscous material to squeeze out from the bottom of the stock 23' on the downstroke of the die 92. The gate forms a "tail" or plug (not shown) between about 1 and 6 inches long on the bottom of each paver block 23 produced. This tail or plug is excess which is trimmed off (and in fact recycled by tossing into the hammer mill 51 for de-consolidation and re-processing in the process 20 in accordance with the invention). The completed paver block 23 measures about 4×8×2½ inches.

Much of the success in producing the highest quality paver block 23 is due to knowing "when" to compact the stock piece 23' in the punch press 92. In general terms, it has been found that compacting the stock pieces 23' within two minutes of their exit from the extruder 44 is too soon, while waiting more than five minutes too long. If compacted too soon they are too soft, if too much time passes by they become too brittle. There is nothing simple about knowing "when" the stock pieces 23' are "ripe" for compaction. To date it has been learned through trial and error for a worker to get that "just so feel" for when the stock piece 23' is ready for compaction. Nevertheless, knowing "when" can indeed be learned through trial and error, and there obvious rewards for doing so. Paver blocks 23 of outstanding quality can be produced as described. The proof of the outstanding quality has been the positive feedback the inventors hereof have gotten from large nationwide retail outfits interested in carrying in their stores the paver blocks 23 whenever a non-experimental production line comes into being.

Practically speaking, the paver blocks 23 are complete at this point in the process 20. However, to overcome consumer reluctance to use the paver blocks 23 in walkways or patios around the home, the paver blocks 23 can be coated and/or sealed 48 (see FIG. 1), to insure against the asphaltic tars therein from tracking onto shoe soles. Example methods of sealing off the asphaltic tars from contact with shoe soles includes immersing the paver blocks 48 in coal tar or paint, or alternatively applying a mineral or granular coating to the top surface. As a bonus, all the coatings/sealants can enhance the attractiveness of the paver blocks 23. Coal tar is interesting because it changes the appearance of the paver block 23 from a matte black to a highly lustrous, reflective gloss. The coal tar can be tinted to give color tones to the block 23 including without limitation grey. Paint, needless to say likewise gives color to the paver block 23. A mineral coating is surprising because it can so completely change the appearance of the paver blocks 23 as to make them appear like quarried, natural stone as sandstone or limestone.

For the like purpose of enhancing ornamentality, the die 92 of the punch press 46 can be recessed with decorative textures/designs in relief which will appear in reverse image on the face of the paver block 23 (this is not shown). One such design has been imitation masonry wherein inset troughs simulate mortar and delimit irregular planforms simulating native rock.

The process 20 in accordance with the invention is adaptable for producing dimensional construction products 22–24 in multi-forms, some of which have been described. For instance, FIG. 8 shows usage of the ingots 22' as retaining wall blocks 22, FIG. 9 shows usage of the paver blocks 23 for a walkway or patio, and FIG. 10 shows a much elongated ingot used as a tire stop 24' for a parking lot. With reference to FIG. 10, producing tire stops 24' from the re-consolidated shingle crumble 32 is advantageous because the inventive tire stop 24 weighs about ⅓ less than a comparably-sized prior art concrete tire stop. Other forms for other uses include without limitation bricks or blocks for (among other uses) landscape borders of flower or shrub gardens, street curbs, Spanish-style roofing tiles, posts, beams, and so on.

Presently it is preferred if the re-consolidation process of the asphaltic crumble is achieved without infusion of any fillers, solvents, or additives of any kind. However these possibilities are not excluded from teachings of the present invention, as will be described more particularly next.

For instance, it would be desirable to add fibrous materials and/or fine mineral matter to stabilize/strengthen the matrix of the competed products. To date, however, it has been discovered that the crumble entrains adequate quantities of these kinds of fibrous and/or filler material either from the shingle itself or the foreign debris that comes along with the shingles after tear-offs, and so on. If, on the other hand, the crumble is lacking in any of these regards, it can be enhanced by adding a stream of the desired fibrous and/or filler material on an as-needed basis.

Also, whereas the drawings show IR heaters for invigorating the flow components in the asphaltic crumble as well as enhancing the fusible components thereof too, other methods are available. For instance, an exothermic reaction can be created by combining in the crumble an acidic compound with an alkaline neutralizer. Example acidic compounds include hydrochloric acid, phosphoric acid, and sulphuric acid. Example alkaline neutralizers include without limitation magnesium oxide, magnesium carbonate, potassium hydroxide, sodium hydroxide, sodium carbonate, sodium bicarbonate, and so on. The alkaline neutralizer chemically reacts with the acidic compound to generate both heat and organic salts such as the alkali metal, ammonium, and organic amine salts of organic and inorganic acids. Much of this kind of work with exothermic reactions has been used in the field of paraffin removal from oilfield equipment. See, e.g., U.S. Pat. No. 5,484,488, entitled "Methods for Melting and Dispersing Paraffin Wax in Oil Field Production Equipment," the disclosure of which is incorporated by this reference. However, these techniques are unknown in the field of waste shingle recycling.

Additionally, a suitable solvent could be added to the asphalt crumble, which have solvating power with the asphalt. Examples include solvent compositions of an aromatic hydrocarbon mixed with non-aromatic hydrocarbons. Representative aromatic hydrocarbon solvents which may be used in the composition include benzene, toluene, xylene, ethyl benzene, propyl benzenes, butyl benzenes, ethyl toluenes and the like. Examples of the non-aromatic component may include naphtha, heptane, octane, cyclohexane, cyclooctane, cycloheptane and the like. Much of this kind of work with solvents for combating paraffin deposits in petroleum equipment has gone on in the petroleum industry. See, e.g., U.S. Pat. No. 4,925,497, entitled "Solvent for Paraffin Removal from Oilfield Equipment." However, much of this work is untried and untested in the field of waste shingle recycling.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A process of converting asphalt composition roofing shingles into dimensional construction products comprising the steps of:
   providing an infeed of asphalt composition roofing shingles having an asphalt component;
   de-consolidating the infeed of asphalt composition roofing shingles into a crumble;
   warming the crumble to a bulk or mean temperature of between about 130° F. and 150° F.;
   compacting and shaping the warmed crumble to obtain a given dimensional construction product; and
   allowing cooling of the dimensional construction product, whereby portions of the asphalt component reconsolidate.

2. The process of claim 1 wherein the infeed of asphalt composition roofing shingles includes foreign debris associated with roof tear-offs.

3. The process of claim 2, further comprising, after the step of de-consolidating the infeed of asphalt composition roofing shingles into a crumble, a step of passing the crumble by a source of magnetism for diverting out magnetically-attractable components of the foreign debris associated with roof tear-offs.

4. The process of claim 3 wherein the passing step comprises cascading the crumble over an end of a belt conveyor, the roller at the end being magnetic and thus limitedly capable of diverting ferritic matter from non-ferritic matter.

5. The process of claim 1 wherein the step of de-consolidating comprises grinding.

6. The process of claim 1 wherein the crumble ranges between extremes of fine matter and coarse matter, the extreme of course matter generally being chunks of about ½ inch.

7. The process of claim 1 wherein the step of warming comprises heat exchange.

8. The process of claim 7 wherein the step of warming includes a source of heat for the heat exchange, the source comprising IR heaters and the heat exchange substantially comprising thermal radiation.

9. The process of claim 1 wherein the step of warming comprises adding reactants which combine in an exothermic reaction.

10. The process of claim 1 wherein the step of compacting comprises extruding.

11. The process of claim 1 wherein the step of compacting comprises extruding and shearing.

12. The process of claim 11 wherein the step of compacting comprises casting and compressing.

13. The process of claim 12 wherein the given dimensional construction product is chosen from the group consisting of retaining wall blocks, paver blocks, tire stops, bricks, curbs, tiles, posts, and beams.

14. The process of claim 7 wherein the heat exchange during the warming step amounts to about 222 Btu (65 W-hr) per pound of the grinding step's output.

* * * * *